May 28, 1946.　　　A. S. BEHRMAN　　　2,400,907
METHOD OF TREATING SILICA GEL
Filed Aug. 14, 1942　　　2 Sheets-Sheet 1
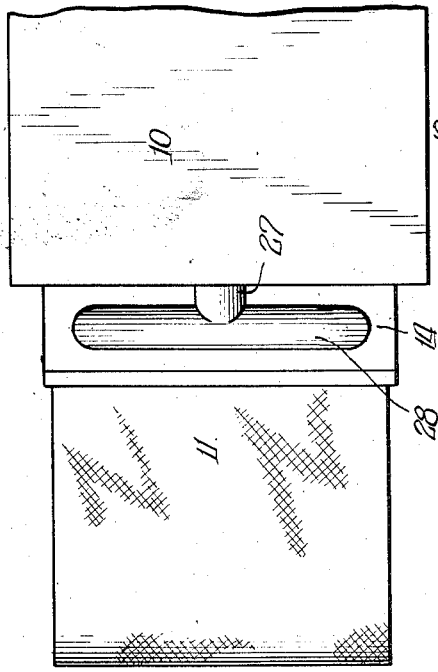
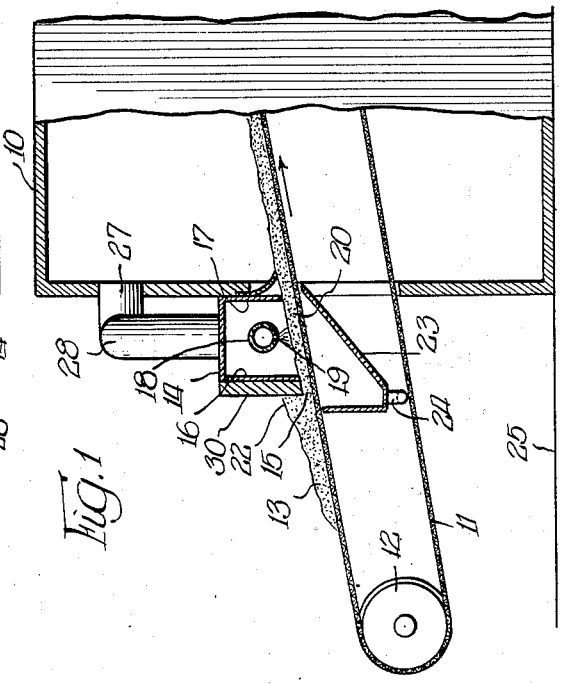
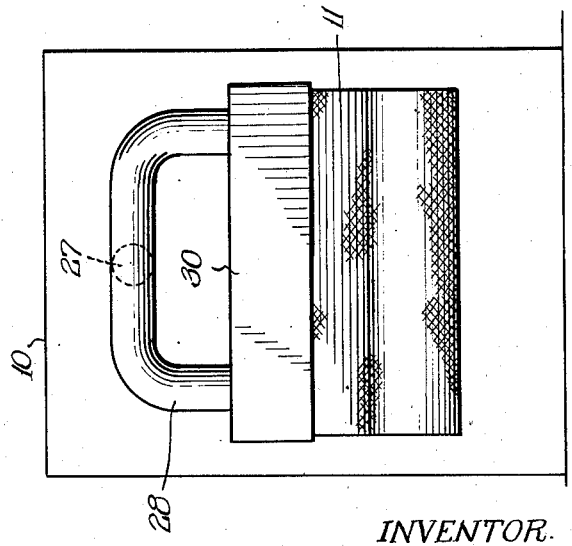
INVENTOR.
Abraham Sidney Behrman,
BY L. A. Paley
atty May 28, 1946.　　　A. S. BEHRMAN　　　2,400,907
METHOD OF TREATING SILICA GEL
Filed Aug. 14, 1942　　2 Sheets-Sheet 2
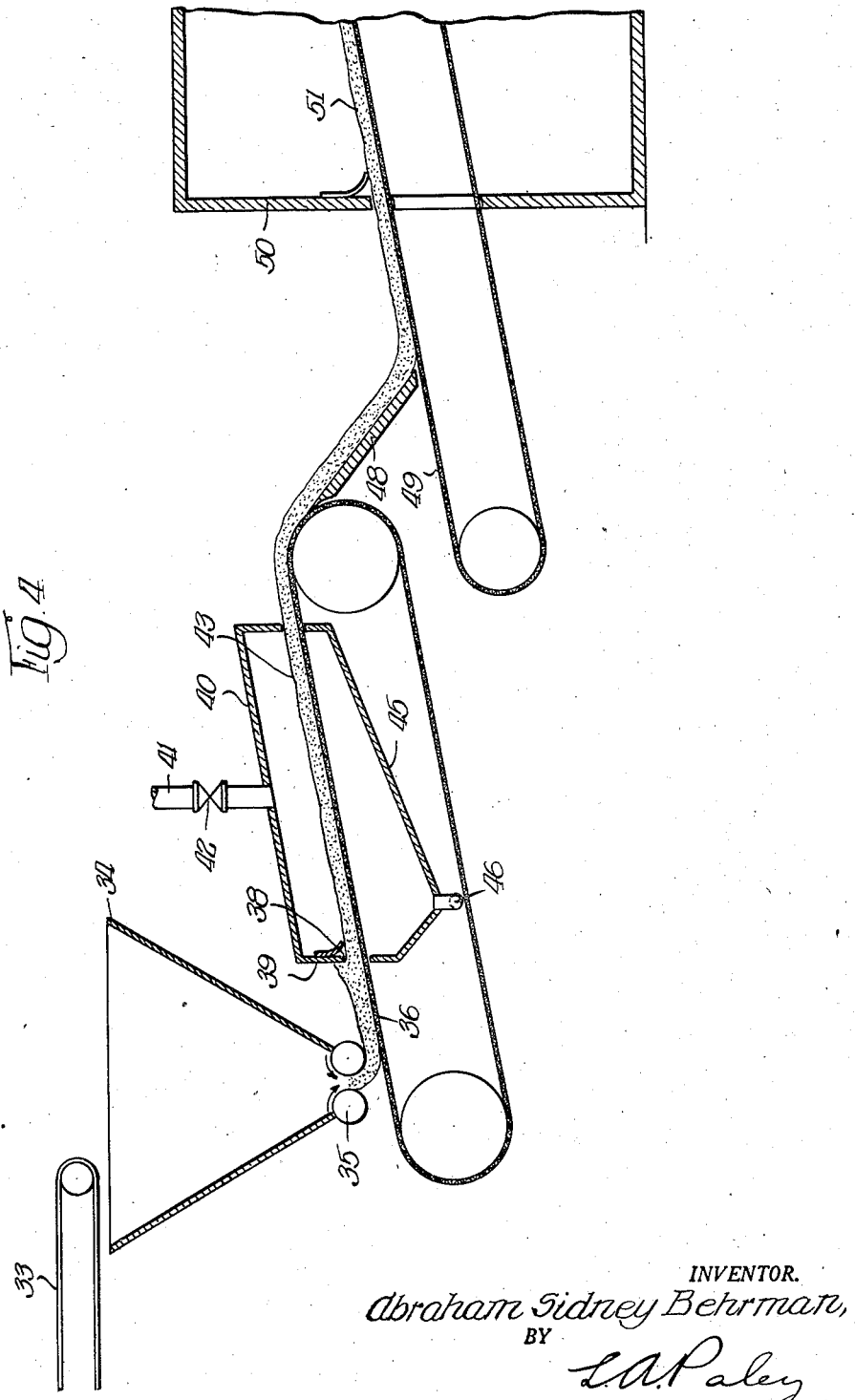
INVENTOR.
Abraham Sidney Behrman,
BY
L.A.Paley
atty.

Patented May 28, 1946

2,400,907

UNITED STATES PATENT OFFICE 2,400,907

METHOD OF TREATING SILICA GEL

Abraham Sidney Behrman, Chicago, Ill., assignor to Infilco Incorporated, Chicago, Ill., a corporation of Delaware Application August 14, 1942, Serial No. 454,875

4 Claims. (Cl. 23—182)

This invention relates to the manufacture of siliceous gels and has reference more particularly to a method and apparatus for the preparation of siliceous gels used as catalysts, catalyst carriers, adsorbents and for other purposes.

In my copending application, Serial No. 371,000, filed December 20, 1940, now issued as Patent No. 2,358,202, I have described a process of producing certain types of low density siliceous gels in which the cast gel is subjected to hydraulic or other pressure, to squeeze out excess liquid from the gel. This pressed gel is then placed in an autoclave and subjected to a steam pressure of 75 to 80 pounds per square inch, for a period of about four hours. The resulting gel has an extremely low apparent density of 12 to 15 pounds per cubic foot. For certain gels, such as those used as catalysts, such a low density is not desired and a density of 30-35 lbs. per cubic foot is more desirable. This is accomplished by steaming or heat treating the pressed gel for a few minutes at atmospheric pressure before drying said gel.

An object of this invention is to provide a method of producing a predetermined density of freshly precipitated and pressed siliceous gel.

Another object of the invention is to provide a method of continuously steaming and drying silica gel which will result in lowered cost of production.

A further object of the invention is to reduce the large lumps of gel prior to treatment and to produce a minimum of fines.

A still further object of the invention is to provide an apparatus for efficiently carrying out the above method; also to improve methods of and apparatus for preparing siliceous gels and catalytic compositions in other respects hereinafter specified and claimed.

Reference is to be had to the accompanying drawings forming a part of this specification, in which Fig. 1 is a diagrammatic, fragmentary, sectional elevation of an apparatus suitable for carrying out the method, Fig. 2 is a fragmentary plan view of the apparatus, Fig. 3 is an end elevation of the apparatus, and Fig. 4 is a side sectional elevation of a modified form of apparatus.

Referring to the drawings by numerals, a drying chamber 10, preferably but not necessarily of the steam coil and moving hot air type, is provided with an endless and foraminous apron or belt 11 which is often made of woven wire. This belt moves around a pulley 12 and a second pulley (not shown) at the opposite end of the drying chamber 10. Silica gel is generally precipitated by mixing two solutions, such as sodium silicate and a mineral acid. If desired, a catalytic agent may be added to the solution and the gel is allowed to set and is partially de-watered by hydraulic or other pressing to squeeze out excess water. The moist and pressed siliceous gel 13 is then deposited onto the foraminous belt 11. This gel contains, dissolved in the water with which it is saturated, a substantial amount of soluble salts resulting from the gel forming reactions, and it is sometimes desirable that these salts be removed, since otherwise they are apt to interfere with the use of the gel composition as a catalyst.

Mounted on the front end of the drying chamber 10 is a steaming chamber 14 which has an open bottom 15 spaced somewhat above the foraminous belt 11. The chamber 14 has a front wall 16 and a rear wall 17. The chamber 14 may be conveniently formed of metal with closed ends. A steam pipe 18 leading from a source of steam, such as a boiler, is provided with downwardly directed jets 19 so that steam impinges directly on a layer 20 of the siliceous composition 13 which is leveled off by the front chamber wall 16. The excess of the composition 13 backs up to form a ridge 22 behind the front chamber wall 16 which thus forms a seal to prevent undue leakage of steam from the chamber 14. When the steam jets 19 travel through the cold composition layer 20, water of condensation is formed from the steam, and this water serves to dissolve out soluble salts from the silica gel composition, thus aiding considerably in purifying the silica gel. Water of condensation is collected in a catch basin 23 having a drain pipe 24. The steam suddenly heats the silica gel so as to lower the density of the dried catalytic composition, form a fibrous structure, and thus improve its catalytic characteristics. I have found that the water of condensation has a tendency to flow down the wire belt 11 by capillary attraction and form an objectionable pool of water on the floor 25. This condition is aggravated because the wire belt 11 travels upwardly on a slope. This water of condensation contains dissolved salts which are corrosive on the conveyor chains and wire belts. In order to avoid this condition, I provide an air pipe 27 which leads from the front of drying chamber 10. A plurality of branch pipes 28 lead from the pipe 27 and direct hot air blown by fans (not shown) in the chamber 10, into the top of steam chamber 14. This hot air serves to blow the water of condensation through the belt 11 into catch basin 23 and thus prevent the water from flowing down the belt 11 and forming a pool of water on the floor. This hot air and steam mixture passing through the layer 20 also serves to free the silica gel from impurities and excess water. A slab of heat insulation 30 is provided on the front wall 16 to prevent the composition in ridge 22 from becoming overheated.

In the modified form of apparatus shown in Fig. 4, the hydraulically pressed siliceous gel containing about 79% moisture is delivered by a conveyor belt 33 to a hopper 34 which is provided near its bottom outlet with a pair of spaced apart driven crushing rolls which serve to break up the large lumps of gel in hopper 34 and deliver the sized gel to a screen belt 36. The fine material in the gel in hopper 34 falls through and the large lumps are crushed to small sizes depending on the space between rolls 35. The wire belt passes through a space 38 beneath a front wall 39 of an elongated steaming chamber 40, said front wall serving to level off the gel to a uniformly thick layer on said belt 36. Steam is introduced into chamber 40 through pipe 41 controlled by valve 42.

The steam passes through the layer of gel 43 on belt 36 and condenses on the gel, thus suddenly raising the temperature of the gel. This sudden application of heat to the gel produces some internal and unknown change in the gel to lower the apparent density of the dried gel to 30–35 lbs. per cubic foot. The steam treatment or cooking effect is obviously very brief as the steaming chamber is relatively small, and is therefore to be clearly distinguished from my above mentioned copending application in which the pressed hydrogel is subjected to autoclaving for prolonged periods. Without the steam treatment of the gel, the dried gel would have an apparent density of 45 lbs. per cubic foot. The water of condensation from the steam drains through the wire belt 36 into a catch basin 45 provided with a drain pipe 46. The gel in the steaming chamber 40 suffers a slight decrease in weight due to the action of the steam.

The steamed gel 43 emerges from steam chamber 40 and slides down chute 48 on to drier wire belt 49 which serves to retard the fall of the lumps of gel and reduce the amount of waste gel fines produced. The gel on drier wire belt 49 passes under the front wall of a drier chamber 50, said wall serving to level off the gel to a uniform gel layer 51 and also form an air seal for the chamber 50. The gel is dried in the chamber 50 and is discharged at the delivery end of drier 50 for further treatment.

The use of the separate steaming belt 36 has the advantage that the speed of said belt 36 may be varied relative to the speed of belt 49 thus providing a greater flexibility in operation and steaming time. The steaming belt 36 can also be given an anti-corrosive protective coating which will reduce the corrosive action of the steam treatment on the metals of the belt 36.

I would state in conclusion that, while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. The method of treating a freshly pressed silica hydrogel containing a substantial quantity of integral salt water solution, which comprises steaming said hydrogel at substantially atmospheric pressure for a period sufficient only to rapidly heat said hydrogel to about the boiling point of water, immediately terminating such heating, and thereafter drying said hydrogel.

2. The method of treating a silica hydrogel containing a substantial quantity of integral salt water solution, which comprises steaming said hydrogel at substantially atmospheric pressure sufficiently to rapidly raise the temperature of the hydrogel to about the boiling point of water, immediately terminating such steaming, and drying said hydrogel.

3. The method of treating a freshly pressed silica hydrogel containing about 79 per cent moisture which comprises steaming said hydrogel at substantially atmospheric pressure for a period sufficient only to heat the hydrogel to about the boiling point of water, and immediately drying the hydrogel.

4. The method of treating a silica hydrogel which comprises pressing said hydrogel sufficiently to reduce the moisture content of said hydrogel to the order of about 79 per cent of the total weight of the hydrogel, forthwith subjecting said hydrogel to steam at atmospheric pressure for a period sufficient only to rapidly heat said hydrogel to about the boiling point of water, and then drying said hydrogel.

ABRAHAM SIDNEY BEHRMAN.